US011292191B2

United States Patent
Schmidt et al.

(10) Patent No.: US 11,292,191 B2
(45) Date of Patent: Apr. 5, 2022

(54) MULTI-MATERIAL FABRICATION WITH DIRECT-WRITE ADDITIVE MANUFACTURING

(71) Applicant: Rosemount Aerospace Inc., Burnsville, MN (US)

(72) Inventors: Wayde R. Schmidt, Pomfret Center, CT (US); Callum Bailey, West Hartford, CT (US)

(73) Assignee: Rosemount Aerospace Inc., Burnsville, MN (US)

( * ) Notice: Subject to any disclaimer, the term of this patent is extended or adjusted under 35 U.S.C. 154(b) by 353 days.

(21) Appl. No.: 16/009,850

(22) Filed: Jun. 15, 2018

(65) Prior Publication Data

US 2019/0381729 A1    Dec. 19, 2019

(51) Int. Cl.
*B29C 64/209*    (2017.01)
*B33Y 10/00*    (2015.01)
(Continued)

(52) U.S. Cl.
CPC .......... *B29C 64/209* (2017.08); *B29C 64/118* (2017.08); *B33Y 10/00* (2014.12);
(Continued)

(58) Field of Classification Search
CPC ... B29C 64/209; B29C 64/118; B29C 64/106; B33Y 10/00; B33Y 30/00; B33Y 70/00; B33Y 80/00; B29K 2101/10; B29K 2105/16; B29K 2995/0005; B29K 2995/0008; H01L 31/00; H01Q 1/00; H05K 3/00; H05K 9/00; H05K 2201/00; A61M 2005/3201
See application file for complete search history.

(56) References Cited

U.S. PATENT DOCUMENTS

| 9,643,358 B2 | 5/2017 | Lewis et al. |
| 9,884,318 B2 | 2/2018 | Tow |
| (Continued) | | |

FOREIGN PATENT DOCUMENTS

| CN | 106393679 A | 2/2017 |
| WO | WO2017/040981 A1 | 3/2017 |

OTHER PUBLICATIONS

Extended European Search Report for EP Application No. 19180672. 8, dated Nov. 6, 2019, 7 pages.

*Primary Examiner* — Jacob T Minskey
*Assistant Examiner* — S. Behrooz Ghorishi
(74) *Attorney, Agent, or Firm* — Kinney & Lange, P.A.

(57) ABSTRACT

An embodiment of a method for operating a direct write device includes operating a first pump to deliver a first fluid feedstock to a first inlet of a multiaxial needle and operating a second pump to deliver a second feedstock to a second inlet of the multiaxial needle. At least the first and second feedstocks are simultaneously drawn or injected through respective first and second axial passages in the multiaxial needle. At least the first and second feedstocks are combining to a common outlet of the multiaxial needle, forming a single multicomponent deposition material having multiple discrete phases without applying external heat to the first or second feedstocks within the needle. The multicomponent deposition material is deposited from the common outlet onto a substrate.

16 Claims, 4 Drawing Sheets

(51) Int. Cl.
    *B33Y 30/00*     (2015.01)
    *B33Y 70/00*     (2020.01)
    *B29C 64/118*     (2017.01)
    *B29K 101/10*     (2006.01)
    *B29K 105/16*     (2006.01)

(52) U.S. Cl.
    CPC ............... *B33Y 30/00* (2014.12); *B33Y 70/00* (2014.12); *B29K 2101/10* (2013.01); *B29K 2105/16* (2013.01); *B29K 2995/0005* (2013.01); *B29K 2995/0008* (2013.01)

(56) References Cited

U.S. PATENT DOCUMENTS

| | | |
|---|---|---|
| 9,941,034 B2 | 4/2018 | Young |
| 2015/0306823 A1 | 10/2015 | Askedall et al. |
| 2015/0352787 A1 | 12/2015 | Humbert et al. |
| 2016/0009029 A1 | 1/2016 | Cohen et al. |
| 2017/0021568 A1* | 1/2017 | Sanz ..................... B33Y 10/00 |
| 2017/0190118 A1 | 7/2017 | Mire et al. |
| 2017/0252967 A9 | 9/2017 | Guillemette et al. |
| 2017/0330654 A1* | 11/2017 | Young ..................... B29D 1/00 |
| 2017/0341296 A1* | 11/2017 | Fenn .................. C08G 18/3225 |
| 2019/0070765 A1* | 3/2019 | Muse .................... B29C 48/501 |
| 2019/0105622 A1 | 4/2019 | Lewis et al. |

\* cited by examiner

MULTI-MATERIAL FABRICATION WITH DIRECT-WRITE ADDITIVE MANUFACTURING

BACKGROUND

The disclosure relates generally to additive manufacturing, and more specifically to generating complex feedstocks for direct-write AM processes.

Extrusion based methods are limited by the need to control multi-extrusion head nozzles, so that usually only one material can be deposited at a time, or the use of pre-compounded filaments or pastes. Commercial nozzle options for mixing materials are typically based on screw extruders for in-line blending of plastics and have limited deposition capability.

SUMMARY

An embodiment of a method for operating a direct write device includes operating a first pump to deliver a first fluid feedstock to a first inlet of a multiaxial needle and operating a second pump to deliver a second feedstock to a second inlet of the multiaxial needle. At least the first and second feedstocks are simultaneously drawn or injected through respective first and second axial passages in the multiaxial needle. At least the first and second feedstocks are combining to a common outlet of the multiaxial needle, forming a single multicomponent deposition material having multiple discrete phases without applying external heat to the first or second feedstocks within the needle. The multicomponent deposition material is deposited from the common outlet onto a substrate.

An embodiment of a direct-write apparatus includes a multiaxial needle extending between a first end and a second end, a first pump, a second pump, and a controller. The needle includes at least a first axial passage with a first inlet, a second axial passage with a second inlet separate from the first inlet, and a common outlet at the second end for at least the first and second axial passages. The first pump is configured to pressurize and deliver a first fluid feedstock from a first reservoir to a first inlet of the multiaxial needle. The second pump is configured to pressurize and deliver a second feedstock from a second reservoir to a second inlet of the multiaxial needle. The controller is configured to operate at least the first and second pumps for drawing or injecting at least the first and second feedstocks through the respective first axial passage and second axial passage in the multiaxial needle to the common output. The multiaxial needle combines at least the first and second feedstocks at the common outlet of the multiaxial needle, forming a single multicomponent deposition material without applying external heat to the feedstocks within the needle.

DETAILED DESCRIPTION

Figure 1:
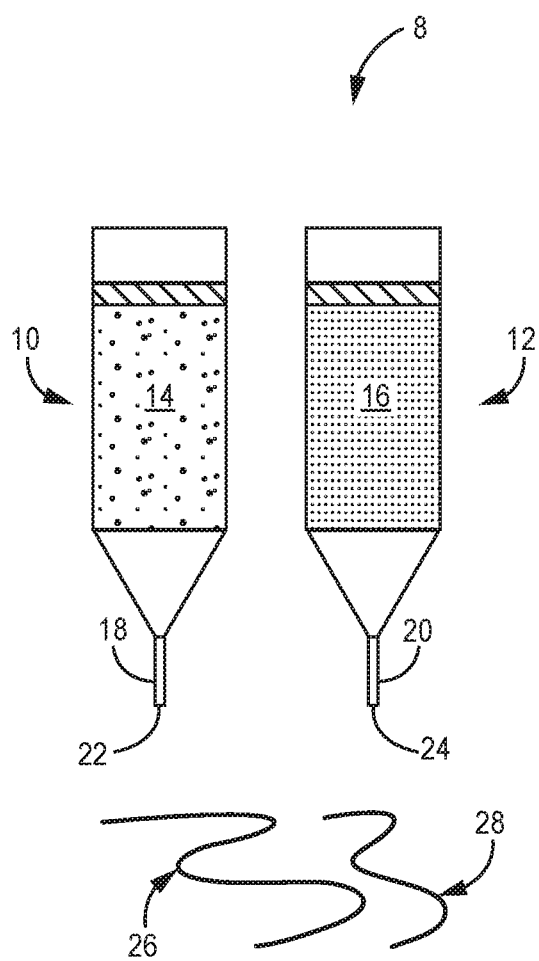
FIG. 1 is a prior art additive printing apparatus.

FIG. 1 shows a conventional approach to extrusion-based deposition methods which are limited by the need to control multi-extrusion head nozzles, so that usually only one material can be deposited at a time. Specifically, FIG. 1 shows system 8 with first reservoir 10, second reservoir 12 with respective first and second feedstocks 14, 16. As can be seen, each feedstock 14, 16 is fed separately through tubes 18, 20 but are not capable of being co-deposited. Rather, each feedstock 14, 16 ends up being fed through separate nozzles 22, 24 to form separate extruded materials 26, 28. Heaters (not shown, typically located at the nozzle tip) are provided to melt the solid feedstocks, typically thermoplastics.

In contrast, coaxial, triaxial and/or multiaxial material feeds allow one or more materials (phases, properties, compositions, viscosities, functionalities, combinations) to be precisely integrated and delivered. For example, a magnetic material can be co-deposited as the core within a nonmagnetic sheath material in a continuous delivery. Alternatively, an external controller can intermittently introduce a Phase B (and optionally Phase C, et. seq.) into an otherwise continuous Phase A delivery form.

Figure 2:
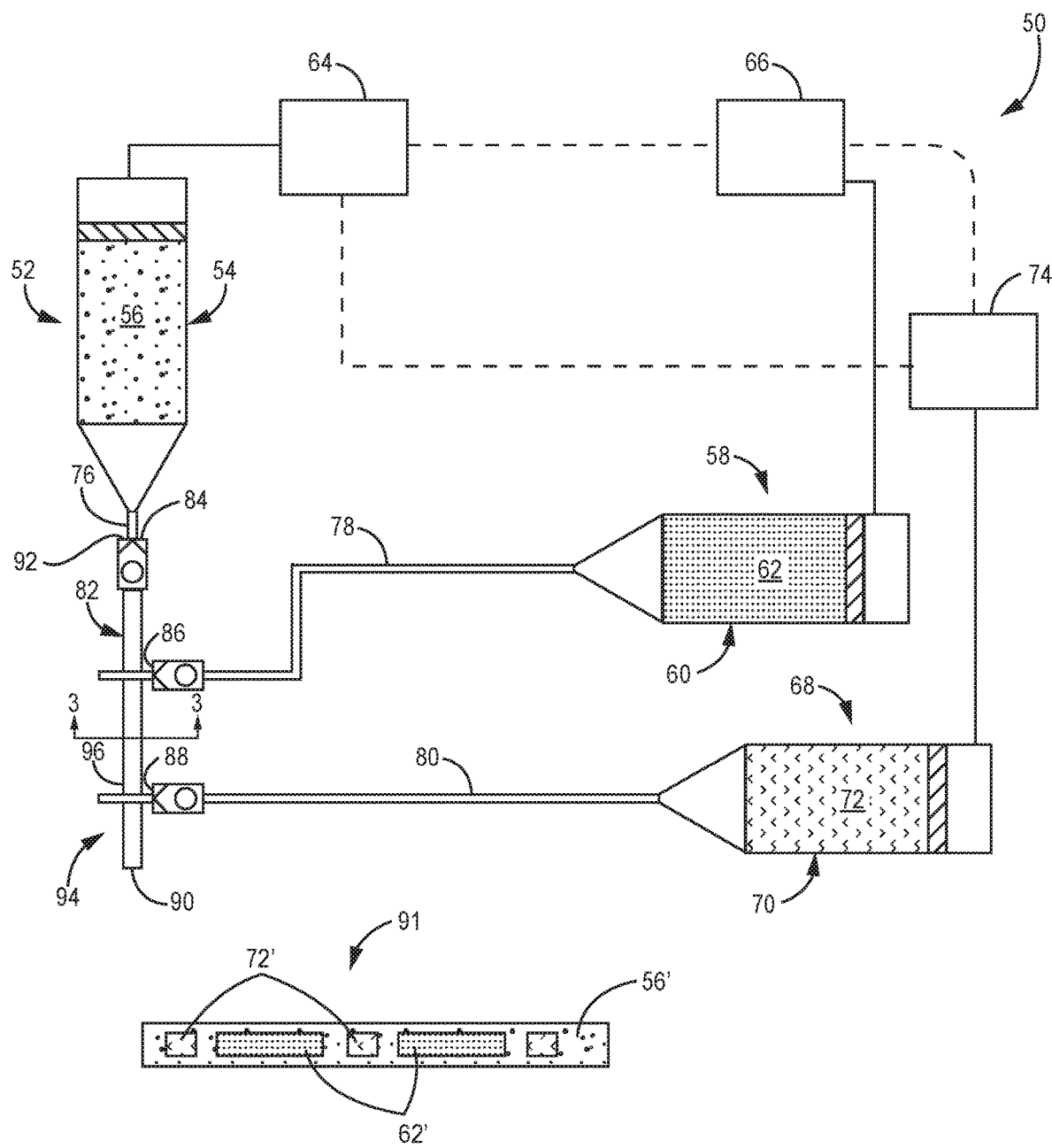
FIG. 2 is a new additive printing apparatus.

FIG. 2 shows an example of an apparatus for precise integration and delivery of multiple feedstocks. FIG. 2 shows apparatus 50 with first pump 52 including first reservoir 54 for first fluid feedstock 56. Second pump 58 includes second reservoir 60 for second feedstock 62, which can be a fluid with or without an additive in order to combine with first fluid feedstock 56. First fluid feedstock 56 can be a fluid at room temperature and either be a relatively pure liquid, or slurry, flowable composite, or other fluidized compound. In certain embodiments, first fluid feedstock 56 is a thixotropic material or includes a thixotropic additive or carrier fluid. Thixotropic materials, such as particle-loaded suspensions, gels, pastes, some network polymers, and colloids, have decreased viscosity under added shear forces (such as when being pressurized) in order to facilitate flow through a needle passage (described below). But upon deposition to a substrate, the viscosity returns to a relatively higher normal state and the combined feedstocks therefore substantially maintain their position on the substrate until post-processing, described later. In some embodiments, the thixotropic materials may be a mixture of particulates and a fluid carrier such as a resin, oligomer or polymer. In some examples, these fluid carriers can be cured using externally applied electromagnetic radiation such as heat, sound, visible light, infrared, ultraviolet, microwave, terahertz, X-ray or combinations thereof. In some examples, these fluid carriers can be cured by exposure to an inert or reactive external gas pressure.

First controller 64 is in communication with first pump 52 to selectively deliver a portion of first fluid feedstock 56 from first reservoir 54, while second controller 66 is in communication with second pump 58 to selectively deliver a portion of second feedstock 62 from second reservoir 60. Optionally, third pump 68 is similarly configured with third reservoir 70, third feedstock 72, and third controller 74. Two or more controllers 64, 66, 74 can also be in communication with one another or with a central controller (not shown).

Each feedstock 56, 62, and optionally 72 is fed through tubes 76, 78, 80, respectively to multiaxial needle 82 which includes inlets 84, 86, 88 and common outlet 90 for delivering a single multicomponent deposition material 91 having discrete phases, without heating the first or second (or optional third) feedstocks 56, 62, 72 within needle 82. The resulting multicomponent deposition material 91, here includes discrete components or phases 56', 62', 72' derived from the above individual feedstocks and having an example geometry or pattern with 62' and 72' alternating coaxially within 56'. The multicomponent deposition material is deposited from common outlet 90 onto a substrate (not shown).

It will be appreciated however that these components or phases 56', 62', 72' can be formed via chemical reaction or other processing so that in certain embodiments, they do not necessarily share the original form or composition of feedstocks 56, 62, 72. Heat is not necessary in needle 82, as the fluid and optional thixotropic nature of one or more feedstocks allow for code position to be achieved via coordinated control of the pumps.

Other prior extrusion approaches are thus typically limited to room temperature solids (e.g., pellets or filaments), primarily thermoplastics, requiring heating and flow control via a custom built nozzle to achieve a single output geometry or pattern. To change the deposition output geometry or pattern in these current arrangements (e.g., FIG. 1), a different nozzle or a nozzle with a complex valve arrangement must be utilized. This is directly in contrast to the approach shown in FIGS. 2-4 utilizing a multiaxial nozzle, electronically controlled pumps, and at least one fluid or fluidized feedstock with optional thixotropic properties.

In this non-limiting example, a first axial passage (shown in FIGS. 3A and 3B) includes first inlet 84 (from first tube 76) at first longitudinal end 92 of needle 82 opposite common outlet 90 at second longitudinal end 94. Also in this non-limiting example, a second parallel axial passage (also shown in FIGS. 3A and 3B) includes a second inlet 86 disposed on circumferential surface 96 of needle 82 between first and second longitudinal ends 92, 94. Optional third (or additional) feedstock 72 can also be directed into an axial passage of needle 82 either near longitudinal end 92 or circumferential surface 96. To facilitate different patterns with a single multiaxial needle 82, first controller 64 can be in communication with at least second controller 66 and vice versa.

Figure 3A:
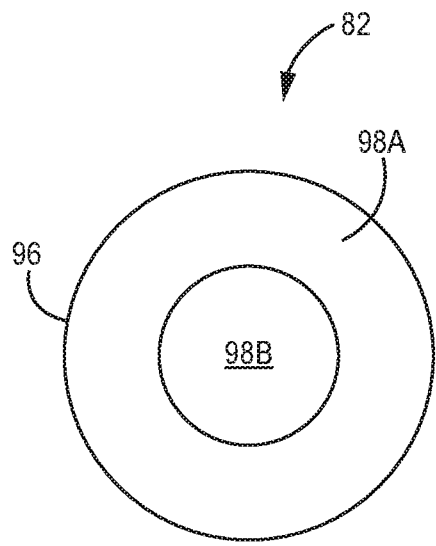
FIG. 3A shows a first example cross-section, taken across line 3-3 of FIG. 2, of a first example multiaxial needle configuration.
Figure 3B:
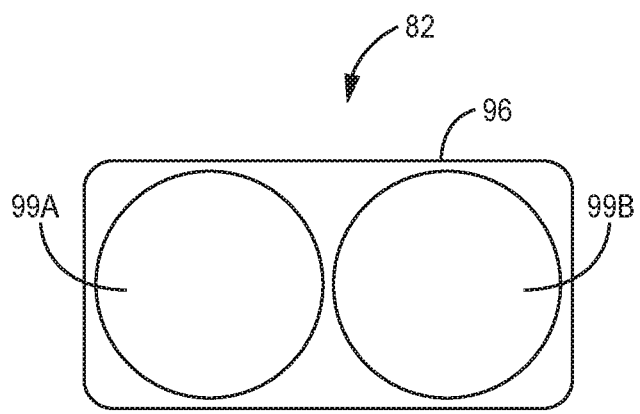
FIG. 3B shows a second example cross-section, taken across line 3-3 of FIG. 2, of a second example multiaxial needle configuration.

FIGS. 3A and 3B show example cross-sections of multiaxial needle 82. In FIG. 3A, first and second axial passages 98A, 98B are not only parallel but are coaxial along at least part of the length of needle 82. And in FIG. 3B, first and second axial passages 99A, 99B are adjacent to each other and do not intersect.

Additionally or alternatively, one can deliver a portion of the third feedstock from the third reservoir to a third axial passage (not shown for clarity) of the multiaxial needle extending at least between a third inlet and the common outlet. This can be a combination or variation of the examples shown in FIG. 3A and/or FIG. 3B. Namely, FIG. 3A can be altered to add a third coaxial passage (not numbered) similar to the first and second passages. Alternatively, one or both passages shown in FIG. 3B can be made coaxial to add additional passages to facilitate inclusion of more than two feedstocks into the final multiaxial feedstock shown in FIG. 2.

Figure 4:
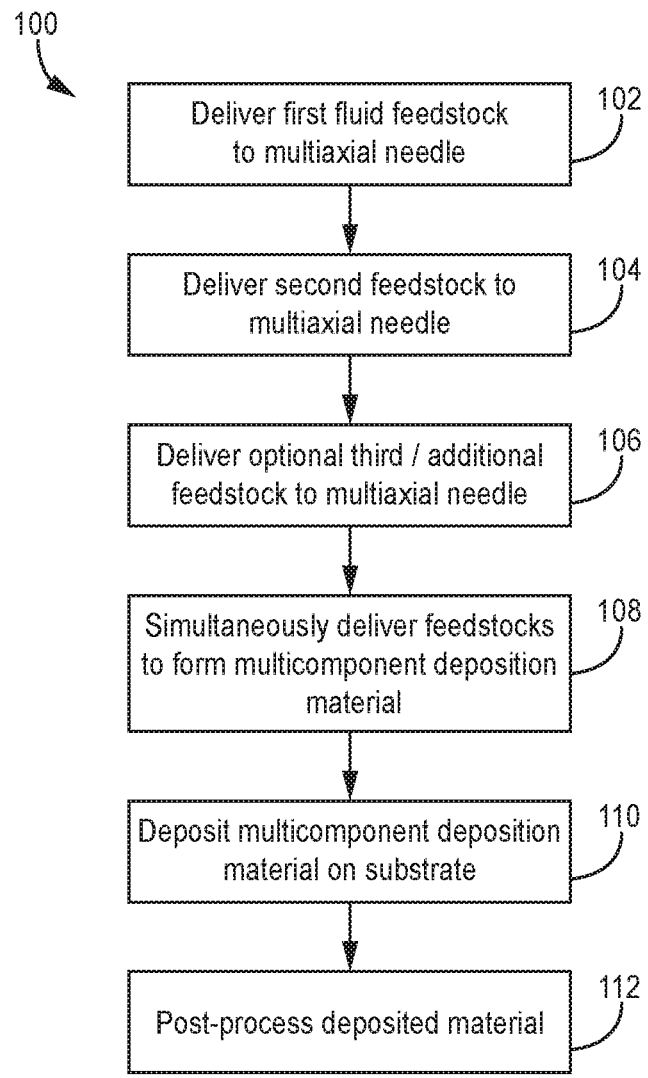
FIG. 4 is a flow chart of an example process according to the disclosure.

Moving to FIG. 4, method 100 includes steps 102-112. According to step 102, a first pump is operated to deliver a first fluid feedstock to a first inlet of a multiaxial needle, such as is shown in FIGS. 2 and 3A-3B. Similarly in step 104, at least a second pump is operated to deliver a second feedstock to a second inlet of the multiaxial needle. Optional step 106 includes one or more (e.g., third or more) feedstocks, inlets, and/or pumps similar to steps 102, 104.

For step 108, at least the first and second feedstocks are simultaneously drawn or pressurized through a first axial passage and a second axial passage in the multiaxial needle to a common outlet. This forms a single multicomponent deposition material having discrete phases without applying external heat to the first or second (or other optional) feedstocks. At step 110, the multicomponent deposition material is deposited onto a substrate, varying in one to three dimensions. With step 112, this deposited material can be post-processed (i.e. cured, polymerized, solidified, densified, sintered, irradiated, heated, magnetized, etc.) to form a final complex geometry of a solid finished part, many of which could not otherwise be formed without the direct write processes described herein.

To facilitate different shapes or geometries, as noted with respect to FIG. 2, the first pump, the second pump, and/or additional optional pumps can be operated continuously relative to one another (i.e., simultaneously). Additionally and/or alternatively, the first pump, the second pump and/or additional optional pumps can be operated intermittently relative to one another to achieve more complex deposition structures. The third feedstock can be materially different in composition or other notable properties from those of the first and second feedstocks. It is contemplated that the appropriate control of the various pumps and feedstocks will enable deposition of discrete or graded structures within the deposited material(s).

For example, feedstock materials can be a liquid, a semi-solid, a mixture of two liquids, or a composite of liquid and solid with the solid including potentially metals, ceramics, glasses, plastics, semiconductors, carbons, etc. In certain embodiments, the second (or additional optional) feedstock, including its composition or other properties are materially different or compositionally different from those of the first fluid material. In other examples, the second material is an electrically conductive or magnetic material. In certain of those embodiments, the first fluid material can be a dielectric material, an electrically insulating material, thermally insulating material, or a precursor of these materials.

As in the apparatus examples shown above, according to various embodiments of the method illustrated in FIG. 4, the first inlet can be at a first longitudinal end of the needle and/or the second (or additional) inlet is disposed on a circumferential surface of the needle between the first longitudinal end and a second opposing longitudinal end containing the common outlet. Also as above, axial passages can be coaxial to one another, adjacent to one another without intersecting, or both.

The multi-material fabrication method using variants of the multi-axial needle arrangement described herein can also be incorporated with a delivery head/robotic arm and appropriate control parameters and programming (e.g., three or more axis capability) to facilitate 1, 2 and 3-dimensional structure fabrication of solid finished parts having various structures. Non-limiting examples of such parts include a printed cable featuring a conductive inner core and dielectric outer sheath and a digital magnetic encoder pattern featuring intermittent deposition of soft or hard ferromagnetic core material within a dielectric sheath. Further examples also include an analog magnetic encoder pattern, featuring continuous deposition of two materials of different magnetic particle concentrations, with the ratio of the two materials continuously adjusted to create a varying magnetic gradient. An RF antenna, featuring intermittent deposition of conductive and dielectric material can also be formed, as well as a heat-shield coating, featuring a functional core material within a thermally-insulating sheath.

DISCUSSION OF POSSIBLE EMBODIMENTS

The following are non-exclusive descriptions of possible embodiments of the present invention.

An embodiment of a method for operating a direct write device includes operating a first pump to deliver a first fluid feedstock to a first inlet of a multiaxial needle and operating a second pump to deliver a second feedstock to a second inlet of the multiaxial needle. At least the first and second feedstocks are simultaneously drawn or injected through respective first and second axial passages in the multiaxial needle. At least the first and second feedstocks are combined to a common outlet of the multiaxial needle, forming a single multicomponent deposition material having multiple discrete phases without applying external heat to the first or second feedstocks within the needle. The multicomponent deposition material is deposited from the common outlet onto a substrate.

The method of the preceding paragraph can optionally include, additionally and/or alternatively, any one or more of the following features, configurations and/or additional components:

A method for operating a direct write device, according to an exemplary embodiment of this disclosure, among other possible things includes operating a first pump to pressurize and deliver a first fluid feedstock to a first inlet of a multiaxial needle; operating a second pump to pressurize and deliver a second feedstock to a second inlet of the multiaxial needle; simultaneously drawing or injecting at least the first and second feedstocks through a respective first axial passage and second axial passage in the multiaxial needle; and combining at least the first and second feedstocks to a common outlet of the multiaxial needle, forming a single multicomponent having multiple discrete phases without applying external heat to the first or second feedstocks within the needle. The multicomponent deposition material is deposited from the common outlet onto a substrate.

A further embodiment of the foregoing method, wherein the first pump is operated continuously relative to the second pump or vice versa.

A further embodiment of any of the foregoing methods, wherein the first pump is operated intermittently relative to the second pump or vice versa.

A further embodiment of any of the foregoing methods, wherein the second feedstock is a thermoset or photoset material different from the first fluid feedstock.

A further embodiment of any of the foregoing methods, wherein the second feedstock comprises an electrically conductive, magnetic composite, or other functional composite material.

A further embodiment of any of the foregoing methods, wherein the first feedstock comprises an electrically conductive, magnetic composite, or other functional composite material with a different particle concentration from the second fluid feedstock.

A further embodiment of any of the foregoing methods, wherein the first fluid feedstock comprises a dielectric material, an electrically insulating material, or a precursor thereof.

A further embodiment of any of the foregoing methods, further comprising: operating a third pump to deliver a third feedstock to a third inlet of the multiaxial needle, the third feedstock different in composition from the first and second feedstocks; wherein the third pump is operated intermittently or continuously relative to at least one of the first pump and the second pump.

A further embodiment of any of the foregoing methods, wherein the first inlet is at a first longitudinal end of the needle, and the second inlet is disposed on a circumferential surface of the needle between the first longitudinal end and a second opposing longitudinal end containing the common outlet.

A further embodiment of any of the foregoing methods, wherein the first and second axial passages are coaxial.

A further embodiment of any of the foregoing methods, wherein the first and second axial passages are adjacent and parallel to each other and do not intersect.

A further embodiment of any of the foregoing methods, wherein at least one of the first fluid feedstock and the second feedstock comprises a thixotropic carrier fluid selected to facilitate deposition through the multiaxial needle and stability after deposition onto a substrate.

A further embodiment of any of the foregoing methods, wherein the thixotropic material comprises a particle suspension or colloid in a thermoset or photoset fluid matrix.

A further embodiment of any of the foregoing methods, further comprising post-processing the multiaxial deposited material into a solid finished part, the post-processing step comprising: photocuring, polymerizing, solidifying, densifying, sintering, irradiating, thermal curing, magnetizing, and combinations thereof.

A further embodiment of any of the foregoing methods, wherein the solid finished part comprises a printed cable including a conductive inner core and dielectric outer sheath, or a digital magnetic encoder pattern, including soft or hard ferromagnetic core material intermittently deposited within a dielectric sheath.

A further embodiment of any of the foregoing methods, wherein the solid finished part comprises an analog magnetic encoder pattern, including first and second materials having different corresponding first and second magnetic particle concentrations, wherein the first and second materials are continuously deposited such that a ratio of the first and second materials is continuously adjusted along at least one dimension to create a varying magnetic gradient along the at least one dimension.

A further embodiment of any of the foregoing methods, wherein the solid finished part comprises an RF antenna, including conductive and dielectric material intermittently or alternately deposited along at least one dimension of the substrate.

A further embodiment of any of the foregoing methods, wherein the solid finished part comprises a heat-shield coating including a thermally or electrically conductive core material disposed within a thermally-insulating sheath.

An embodiment of a direct-write apparatus includes a multiaxial needle extending between a first end and a second end, a first pump, a second pump, and a controller. The needle includes at least a first axial passage with a first inlet, a second axial passage with a second inlet separate from the first inlet, and a common outlet at the second end for at least the first and second axial passages. The first pump is configured to pressurize and deliver a first fluid feedstock from a first reservoir to a first inlet of the multiaxial needle. The second pump is configured to pressurize and deliver a second feedstock from a second reservoir to a second inlet of the multiaxial needle. The controller is configured to operate at least the first and second pumps for drawing or injecting at least the first and second feedstocks through the respective first axial passage and second axial passage in the multiaxial needle to the common output. The multiaxial needle combines at least the first and second feedstocks at the common outlet of the multiaxial needle, forming a single multicomponent deposition material without applying external heat to the feedstocks within the needle.

The apparatus of the preceding paragraph can optionally include, additionally and/or alternatively, any one or more of the following features, configurations and/or additional components:

A direct write apparatus, according to an exemplary embodiment of this disclosure, among other possible things includes a multiaxial needle extending between a first end and a second end, the needle including at least a first axial passage with a first inlet, a second axial passage with a second inlet separate from the first inlet, and a common outlet at the second end for at least the first and second axial passages; a first pump to pressurize and deliver a first fluid feedstock from a first reservoir to a first inlet of the multiaxial needle; a second pump to pressurize and deliver a second feedstock from a second reservoir to a second inlet of the multiaxial needle; and a controller configured to operate at least the first and second pumps for drawing or injecting at least the first and second feedstocks through the respective first axial passage and second axial passage in the multiaxial needle to the common output; wherein the multiaxial needle combines at least the first and second feedstocks at the common outlet of the multiaxial needle, forming a single multicomponent deposition material without applying external heat to the feedstocks within the needle.

A further embodiment of the foregoing apparatus, wherein the first inlet is at a first longitudinal end of the needle and the second inlet is disposed on a circumferential surface of the needle between the first end and the second end.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
   operating a first pump to pressurize and deliver a first fluid feedstock to a first inlet of a multiaxial needle;
   operating a second pump to pressurize and deliver a second feedstock to a second inlet of the multiaxial needle, wherein the second pump is fluidly isolated from the first pump;
   continuously drawing or injecting the first fluid feedstock through a first axial passage in the multiaxial needle via the first pump, the first axial passage extending from the first inlet to a common outlet of the multiaxial needle;
   intermittently drawing or injecting the second feedstock through a second axial passage in the multiaxial needle via the second pump, the second axial passage extending from the second inlet to the common outlet, wherein the first and second axial passages do not intersect between each of the first and second inlets and the common outlet, and wherein the second feedstock is drawn or injected intermittently while the first fluid feedstock is drawn or injected;
   combining at least the first fluid feedstock and the second feedstock at the common outlet of the multiaxial needle, forming a single multicomponent deposition material without applying external heat to the first fluid feedstock or the second feedstock within the multiaxial needle;
   forming a structure comprising a plurality of second feedstock cores disposed on a common axis and axially separated by and surrounded by the first fluid feedstock, wherein forming the structure comprises:
      continuously depositing the first fluid feedstock from the common outlet onto a substrate; and
      intermittently depositing the single multicomponent deposition material from the common outlet onto the substrate to form the plurality of second feedstock cores.

2. The method of claim 1, wherein the second feedstock is a thermoset or photoset material of different composition from the first fluid feedstock.

3. The method of claim 1, wherein the second feedstock comprises an electrically conductive material, magnetic composite material, or other functional composite material.

4. The method of claim 3, wherein the first fluid feedstock comprises a dielectric material, an electrically insulating material, or a precursor thereof.

5. The method of claim 3, further comprising:
   operating a third pump to deliver a third feedstock to a third inlet of the multiaxial needle, the third feedstock different in composition from the first fluid feedstock and the second feedstock;
   wherein the third pump is operated intermittently or continuously relative to at least one of the first pump and the second pump.

6. The method of claim 5, wherein the third feedstock comprises an electrically conductive material, magnetic composite material, or other functional composite material with a different particle concentration from the second feedstock.

7. The method of claim 1, wherein the first inlet is at a first longitudinal end of the multiaxial needle, and the second inlet is disposed on a circumferential surface of the multiaxial needle between the first longitudinal end and a second opposing longitudinal end containing the common outlet.

8. The method of claim 1, wherein the first and second axial passages are coaxial.

9. The method of claim 1, wherein the first and second axial passages are adjacent and parallel to each other.

10. The method of claim 1, wherein at least one of the first fluid feedstock and the second feedstock comprises a thixotropic material selected to facilitate deposition through the multiaxial needle and stability after deposition onto the substrate.

11. The method of claim 10, wherein the thixotropic material comprises a particle suspension or colloid in a thermoset or photoset fluid matrix.

12. The method of claim 1, further comprising:
   post-processing the structure into a solid finished part, the post-processing step comprising:
      photocuring, polymerizing, solidifying, densifying, sintering, irradiating, thermal curing, magnetizing, or combinations thereof.

13. The method of claim 12, wherein the solid finished part comprises a digital magnetic encoder pattern, including soft or hard ferromagnetic core material intermittently deposited within a dielectric sheath.

14. The method of claim 12, wherein the solid finished part comprises an analog magnetic encoder pattern, including first and second materials having different corresponding first and second magnetic particle concentrations, wherein the first and second materials are continuously deposited such that a ratio of the first and second materials is continuously adjusted along at least one dimension to create a varying magnetic gradient along the at least one dimension.

15. The method of claim 12, wherein the solid finished part comprises an RF antenna, including conductive and dielectric material intermittently or alternately deposited along at least one dimension of the substrate.

16. The method of claim 12, wherein the solid finished part comprises a heat-shield coating including a thermally or electrically conductive core material disposed within a thermally-insulating sheath.

* * * * *